(12) United States Patent
Wong et al.

(10) Patent No.: US 11,349,117 B2
(45) Date of Patent: May 31, 2022

(54) MAGNETITE (FE₃O₄)—MULTIWALLED CARBON NANOTUBE COMPOSITE STRUCTURES WITH PERFORMANCE AS HIGH RATE ELECTRODE MATERIALS FOR LI-ION BATTERIES

(71) Applicant: The Research Foundation for The State University of New York, Albany, NY (US)

(72) Inventors: Stanislaus Wong, Upton, NY (US); Lei Wang, Port Jefferson, NY (US); Coray McBean, Malverne, NY (US); Amy C. Marschilok, Stony Brook, NY (US); Kenneth Takeuchi, Stony Brook, NY (US); Esther S. Takeuchi, Stony Brook, NY (US)

(73) Assignee: The Research Foundation for the State University of New York, Albany, NY (US)

( * ) Notice: Subject to any disclaimer, the term of this patent is extended or adjusted under 35 U.S.C. 154(b) by 211 days.

(21) Appl. No.: 16/250,838

(22) Filed: Jan. 17, 2019

(65) Prior Publication Data
US 2019/0260013 A1 Aug. 22, 2019

Related U.S. Application Data

(60) Provisional application No. 62/618,248, filed on Jan. 17, 2018.

(51) Int. Cl.
*H01M 4/36* (2006.01)
*H01M 10/0525* (2010.01)
(Continued)

(52) U.S. Cl.
CPC .......... *H01M 4/364* (2013.01); *H01M 4/366* (2013.01); *H01M 4/485* (2013.01); *H01M 4/523* (2013.01);
(Continued)

(58) Field of Classification Search
None
See application file for complete search history.

(56) References Cited

U.S. PATENT DOCUMENTS 7,122,106 B2 10/2006 Lin et al.
8,426,061 B2 4/2013 Nesper et al.
(Continued)

OTHER PUBLICATIONS

Wang et al., Correlating Preparative Approaches with Electrochemical Performance of Fe3O4-MWNT Composites Used as Anodes in Li-ion Batteries, ECS Journal of Solid State Science and Technology, 6 (6) M3122-M3121 (Year: 2017).*
(Continued)

*Primary Examiner* — Carmen V Lyles-Irving
(74) *Attorney, Agent, or Firm* — Alan M. Sack; John F. Vodopia; Sack IP Law p.c.

(57) ABSTRACT

A method of synthesizing an electrode material for lithium ion batteries from Fe₃O₄ nanoparticles and multiwalled carbon nanotubes (MWNTs) to yield (Fe₃O₄-NWNTs) composite heterostructures. The method includes linking the Fe₃O₄ nanoparticles and multiwalled carbon nanotubes using a π-π interaction synthesis process to yield the composite heterostructure electrode material. Since Fe₃O₄ has an intermediate voltage, it can be considered an anode (when paired with a higher voltage material) or a cathode (when paired with a lower voltage material).

23 Claims, 8 Drawing Sheets

(51) Int. Cl.
  *H01M 4/52* (2010.01)
  *H01M 4/587* (2010.01)
  *H01M 4/485* (2010.01)
  *H01M 4/02* (2006.01)

(52) U.S. Cl.
  CPC ....... *H01M 4/587* (2013.01); *H01M 10/0525* (2013.01); *H01M 2004/021* (2013.01); *H01M 2004/027* (2013.01)

(56) References Cited

U.S. PATENT DOCUMENTS

| | | |
|---|---|---|
| 8,435,676 B2 | 5/2013 | Zhamu et al. |
| 8,450,014 B2 | 5/2013 | Liu et al. |
| 8,493,711 B2 | 7/2013 | Seymour |
| 8,503,162 B2 | 8/2013 | Seymour |
| 8,614,878 B2 | 12/2013 | Seymour |
| 8,920,970 B2 | 12/2014 | Sunkara et al. |
| 8,936,874 B2 | 1/2015 | Shi |
| 8,968,820 B2 | 3/2015 | Zhanu et al. |
| 9,005,816 B2 | 4/2015 | Amine et al. |
| 9,070,942 B2 | 6/2015 | Liu et al. |
| 9,237,658 B2 | 1/2016 | Dai et al. |
| 9,391,319 B2 | 7/2016 | Shevchenko et al. |
| 9,393,214 B2 | 7/2016 | Fichter et al. |
| 9,450,224 B2 | 9/2016 | Lu et al. |
| 9,543,054 B2 | 1/2017 | Ban et al. |
| 9,643,842 B2 | 5/2017 | Tan et al. |
| 9,923,206 B2 | 3/2018 | Chen et al. |
| 9,954,220 B2 | 4/2018 | Li et al. |
| 10,109,845 B2 | 10/2018 | Worsley et al. |
| 10,468,674 B2 | 11/2019 | Salem et al. |
| 10,529,983 B2 | 1/2020 | Lee et al. |
| 10,559,830 B2 | 2/2020 | Zhanu et al. |
| 10,693,139 B2 | 6/2020 | Kang et al. |
| 10,700,361 B2 | 6/2020 | Liu et al. |
| 10,707,025 B2 | 7/2020 | Chai et al. |
| 10,727,002 B2 | 7/2020 | Chai et al. |
| 10,818,442 B2 | 10/2020 | Choi et al. |
| 10,883,955 B2 | 1/2021 | Yu et al. |
| 10,910,655 B2 | 2/2021 | Lu et al. |
| 10,950,849 B2 | 3/2021 | Archer et al. |
| 10,971,727 B2 | 4/2021 | Duan et al. |
| 11,183,688 B2 | 11/2021 | Abruna et al. |
| 11,217,792 B2 | 1/2022 | Zhamu et al. |

OTHER PUBLICATIONS

Fang, Zewei et al., Preparation and Performance of Fe3O4/MWCNTs "Core-Shell" Hybrids Used in LIBs, New Chemical Materials, vol. 43, No. 9, Sep. 2015 (Year: 2015).*

* cited by examiner

MAGNETITE (FE$_3$O$_4$)—MULTIWALLED CARBON NANOTUBE COMPOSITE STRUCTURES WITH PERFORMANCE AS HIGH RATE ELECTRODE MATERIALS FOR LI-ION BATTERIES

CROSS-REFERENCE TO RELATED APPLICATIONS

This application derives the benefit of the filing date of U.S. Provisional Patent Application No. 62/618,248, filed Jan. 17, 2018. The contents of the provisional application are incorporated herein by reference.

GOVERNMENT SUPPORT STATEMENT

This invention was made with government support under DE-SC0012673 awarded by the US Department of Energy. The government has certain rights in the invention.

BACKGROUND OF THE INVENTION

The invention broadly relates to lithium ion batteries, and more particularly relates to a method for synthesizing an electrode material for lithium ion batteries from magnetite (Fe$_3$O$_4$) nanoparticles and multiwalled carbon nanotubes (MWNTs) to yield composite heterostructures (Fe$_3$O$_4$-NWNTs) by linking the magnetite and MWNTs using a π-π interaction synthesis process, an Electrode fabricated with the nanocomposite material synthesized according to the method and a battery including such an electrode. Since Fe$_3$O$_4$ has an intermediate voltage, it can be considered an anode (when paired with a higher voltage material) or a cathode (when paired with a lower voltage material).

BACKGROUND OF THE RELATED ART

Lithium ion battery (LIB) applications have experienced significant growth over the past two decades. Today LIBs are widely used and denote the battery of choice for a wide range of applications, from portable electronics to electric vehicles. Y. Wu, Y. Wei, J. P. Wang, K. L. Jiang, and S. S. Fan, Nano Lett., 13, 818 (2013); C. M. Ban, Z. C. Wu, D. T. Gillaspie, L. Chen, Y. F. Yan, J. L. Blackburn, and A. C. Dillon, Adv. Mater., 22, E145 (2010); D. C. S. Souza, V. Pralong, A. J. Jacobson, and L. F. Nazar, Science, 296, 2012 (2002); E. S. Takeuchi, A. C. Marschilok, K. Tanzil, E. S. Kozarsky, S. Zhu, and K. J. Takeuchi, Chem. Mater., 21, 4934 (2009); and P. Poizot, S. Laruelle, S. Grugeon, L. DuPont, and J. M. Tarascon, Nature, 407, 496 (2000).

Although LIBs have shown impressive commercial success, an understanding of the intrinsic functioning of LIB electrodes and of their constituent component materials still represents a subject of significant research. In recent years, the use of energy storage devices has expanded into new areas, including with uninterrupted power sources (UPS), stationary storage batteries (SSBs), and the automotive market, which encompasses both electric vehicles and hybrid electric vehicles.

As an electroactive material, an inverse spinel structure of magnetite (Fe$_3$O$_4$) was considered an ideal candidate as an electrode material in LIBs, due to magnetite's (i) significantly larger reversible capacity (i.e., 926 mAh g−1, when reacting with eight lithium equivalents), (ii) plentiful earth abundance and (iii) relative non-toxicity. S. L. Zhu, A. C. Marschilok, E. S. Takeuchi, G. T. Yee, G. B. Wang, and K. J. Takeuchi, J. Electrochem. Soc., 157, A1158 (2010).

During the reversible conversion reaction between lithium ions and magnetite, however, iron nanocrystals tend to form and become dispersed in a Li$_2$O matrix. This process usually gives rise to poor cycling stability and rate capacity due to dramatic volume variation upon electrochemical cycling. The poor cycling stability leads to physical crumbling and cracking of electrodes as well as to a loss of electrical connectivity with the current collector. Y. Jiang, Z. J. Jiang, L. F. Yang, S. Cheng, and M. L. Liu, J. Mater. Chem. A, 3, 11847 (2015); Q. T. Qu, J. M. Chen, X. X. Li, T. Gao, J. Shao, and H. H. Zheng, J. Mater. Chem. A, 3, 18289 (2015).

It also been noted that at high current densities within electrodes formed therewith, additional performance degradation takes place, resulting not only from sluggish kinetics for charge transfer and ionic diffusion but also from Fe$_3$O$_4$'s intrinsically low electronic conductivity. Y. He, L. Huang, J. S. Cai, X. M. Zheng, and S. G. Sun, Electrochim. Acta, 55, 1140 (2010); L. Yang, J. H. Hu, A. G. Dong, and D. Yang, Electrochim. Acta, 144, 235 (2014).

Two approaches are known to have been employed in attempts to circumvent these limitations with the goal of generating Fe$_3$O$_4$ electrodes, with improved and enhanced rate capability and cycling stability. One approach is to optimize the size of Fe$_3$O$_4$ nanoparticles to improve the Li-ion diffusion and electron transport within the metal oxide nanoparticles. S. L. Zhu, A. C. Marschilok, E. S. Takeuchi, G. T. Yee, G. B. Wang, and K. J. Takeuchi, J. Electrochem. Soc., 157, A1158 (2010); Z. M. Cui, L. Y. Hang, W. G. Song, and Y. G. Guo, Chem. Mater., 21, 1162 (2009).

For instance, enhanced ion transport kinetic behavior has been observed for high surface area, small crystallite size, nano-sized magnetite. Specifically, nanocrystalline Fe$_3$O$_4$ with an average diameter of about 8 nm yielded approximately a 100% enhancement in capacity as compared with that found for ~26 nm magnetite nanomaterials above 1.2 V during constant current discharge, though the Fe$^{n+}$ oxidation state difference would have predicted only a 10% increase in capacity. J. Durham, E. S. Takeuchi, A. C. Marschilok, and K. J. Takeuchi, ECS Trans., 66, 111 (2015).

Another approach employed to attempt circumvention of these limitations with the goal of generating Fe$_3$O$_4$ electrodes introduced conductive agents, such as carbon nanofibers, graphene, and carbon nanotubes (CNTs), to enhance the overall electronic conductivity of the combination and to accommodate for the large volume change. Carbon nanotubes (CNTs), specifically, are known for use as conductive additives in light of their high aspect ratios and proven superior mechanical and electrical properties (including favorable ballistic transport). Y. Wu, Y. Wei, J. P. Wang, K. L. Jiang, and S. S. Fan, Nano Lett., 13, 818 (2013). For instance, Wu, et al., have reported on the formation of uniform Fe$_3$O$_4$ sheathes deposited onto aligned CNT scaffolds using magnetron sputtering; these composites achieved capacities of 836 mAh g$^{-1}$ after 100 cycles at a current rate of 0.1 A/g. Utilizing Magnetron sputtering, however, can only deposit material from a specific direction (see diagram at http://www.semicore.com/what-is-sputtering). Furthermore, it is not possible to create three dimensional structures utilizing magnetron sputtering.

In addition, Ban, et al., have generated binder-free and high-rate LIB s, incorporating nanostructured Fe$_3$O$_4$-single-walled carbon nanotube (SWNT) electrodes. Such composite was found to deliver 800 mAh g$^{-1}$ at 5 C and 600 mAh g$^{-1}$ at 10 C, respectively, with a 5 wt % content of SWNTs. C. M. Ban, Z. C. Wu, D. T. Gillaspie, L. Chen, Y. F. Yan, J.

L. Blackburn, and A. C. Dillon, Adv. Mater., 22, E145 (2010). It is well known in the field that a C-rate is a measure of the rate at which a battery is (dis)charged relative to its theoretical capacity, where the higher the C rate, the faster the rate of (dis)charge (i.e. 1 C=1 hour rate, 5 C=1/5=0.2 hour rate, C/20=20 hour rate).

Also, He, et al. have prepared CNT-66.7% $Fe_3O_4$ nanocomposite electrodes, evincing moderate capacities of 656 mAh $g^{-1}$ at 0.1 A/g after 145 cycles. Y. He, L. Huang, J. S. Cai, X. M. Zheng, and S. G. Sun, Electrochim. Acta, 55, 1140 (2010).

Two known methods of joining the NPs and MWTs to form nanocomposite materials are the physical sonication method, and the covalent attachment protocol. The physical sonication method is akin to a van der Waals-inspired "joining together" of NPs and MWNTs into a discrete composite, and as such, this process preserves the structural integrity of each individual constituent component. The covalent attachment protocol requires actual chemical bond formation between the oxygenated species on the functionalized MWNTs and the NPs via the mediation of complementary amine-functional linker groups. J. Tucek, K. C. Kemp, K. S. Kim, and R. Zboril, ACS Nano, 8, 7571 (2014).

SUMMARY OF THE INVENTION

The invention provides a method for fabricating a nanocomposite electrode material for lithium ion batteries that overcomes the shortcomings of the prior art. By contrast to the covalent bonding and physical sonication processes of the prior art, a π-π interaction synthesis of the invention creates the linkage by the formation of π-bonds between the aromatic phenyl rings in the linker and the underlying MWNT conjugated network.

The inventors have observed unexpected, but important nuances in the electrochemical behavior of these heterostructures that are a direct function and consequence of how the nanocomposites have been specifically formed, and consequently how these two components (i.e. NPs and MWNTs) are actually bound together within discrete heterostructures. The inventive results therefore highlight the importance of preparative technique in governing the resulting electrochemical observations and trends. Both structural and electrochemical characterization protocols have been used to systematically correlate electrochemistry with the corresponding attachment protocols.

In one embodiment, the method for fabricating a nanocomposite electrode material includes providing multiwalled carbon nanotubes (MWNTs) having surfaces coated with oxygenated moieties such as carboxylic acid functional groups, providing magnetite ($Fe_3O_4$) nanoparticles and attaching the $Fe_3O_4$ nanoparticles onto the MWNTs to fabricate composite heterostructures ($Fe_3O_4$-MWNTs) using a π-π interaction synthesis process. An electrode fabricated with the nanocomposite material synthesized according to the method and a battery including such an electrode are also disclosed. Since $Fe_3O_4$ has an intermediate voltage, it can be utilized as an anode (when paired with a higher voltage material) or as a cathode (when paired with a lower voltage material).

Electrodes fabricated with composites synthesized through π-π interaction synthesis process provide for efficient charge transfer due to a presence of a conjugated aromatic system, fast Li-ion diffusion rate owing to a relatively short linker length and a favorable retention of a greater degree of physical integrity after cycling.

BRIEF DESCRIPTION OF THE DRAWINGS

Further features and advantages of the invention will become apparent from the description of embodiments that follows, with reference to the attached figures, in which:

FIG. 3b is a TEM image depicting morphology at 10 nm of $Fe_3O_4$-MWNT composites with a 50 wt % of $Fe_3O_4$ loading, synthesized by the covalent attachment protocol of FIG. 1;

FIG. 3c is depicts selected area electron diffraction (SAED) results for the $Fe_3O_4$-MWNT composites with a 50 wt % of $Fe_3O_4$ loading, synthesized by the covalent attachment protocol of FIG. 1;

FIG. 3d is a TEM image depicting morphology at 100 nm of the $Fe_3O_4$-MWNT composites with a 50 wt % of $Fe_3O_4$ loading, synthesized by a prior art physical sonication method;

FIG. 3e is a TEM image depicting morphology at 10 nm of $Fe_3O_4$-MWNT composites with a 50 wt % of $Fe_3O_4$ loading, synthesized by the prior art physical sonication method;

FIG. 3f is depicts selected area electron diffraction (SAED) results for the $Fe_3O_4$-MWNT composites with a 50 wt % of $Fe_3O_4$ loading, synthesized by the prior art physical sonication method;

FIG. 3g is a TEM image depicting morphology at 100 nm of the $Fe_3O_4$-MWNT composites with a 50 wt % of $Fe_3O_4$ loading, synthesized by the π-π interaction process of the invention, illustrated in FIG. 2;

FIG. 3h is a TEM image depicting morphology at 10 nm of $Fe_3O_4$-MWNT composites with a 50 wt % of $Fe_3O_4$ loading, synthesized by the π-π interaction process of the invention;

FIG. 3i depicts selected area electron diffraction (SAED) results for the $Fe_3O_4$-MWNT composites with a 50 wt % of $Fe_3O_4$ loading, synthesized by the π-π interaction process of the invention;

FIG. 5b depicts first and second discharge and charge profiles of cells containing the $Fe_3O_4$-MWNT composite electrodes formed by the prior art sonication (So) process tested at a C/10 rate;

FIG. 5c depicts first and second discharge and charge profiles of cells containing the $Fe_3O_4$-MWNT composite electrodes formed by the covalent (co) attachment process of FIG. 1 tested at a C/10 rate;

FIG. 5d depicts first and second discharge and charge profiles of cells containing the $Fe_3O_4$-MWNT-physically mixed control electrodes tested C/10 rate (control);

FIG. 7b depicts CV results of $Fe_3O_4$-MWNT-So heterostructure at a 0.1 mV/s scan rate;

FIG. 7c depicts CV results of $Fe_3O_4$-MWNT-CO heterostructure at a 0.1 mV/s scan rate;

FIG. 7d depicts CV results of $Fe_3O_4$-MWNT-control heterostructure at a 0.1 mV/s scan rate;

FIG. 9A depicts $Z_{re}$ versus $\omega^{-0.5}$ data associated with electrodes formed with the respective synthesized $Fe_3O_4$-MWNT-π, $Fe_3O_4$-MWNT-So, $Fe_3O_4$-MWNT-CO and $Fe_3O_4$-MWNT-physically mixed control composites of the samples analyzed, after 30 cycles of testing.

DETAILED DESCRIPTION OF THE INVENTION

The following detailed description of embodiments of the invention will be made in reference to the accompanying drawings. In describing the invention, explanation about related functions or constructions known in the art are omitted for the sake of clarity in understanding the concept of the invention to avoid obscuring the invention with unnecessary detail.

The inventive method effectively anchors magnetite ($Fe_3O_4$) nanoparticles (NPs), with average diameters of 8-10 nm, and a loading ratio of 50 wt %, onto multi-walled carbon nanotube (MWNT) sidewalls using a π-π interaction synthesis process, to yield $Fe_3O_4$-MWNT composite (heterostructures).

$Fe_3O_4$-MWNT composite (heterostructures) fabricated using the prior processes, including Sonication process, Covalent process and the physically mixed Control process are compared with the heterostructures synthesized by the π-π interaction synthesis process of the invention. Sonication includes dispersing MWNTs in an $H_2O$: dimethyl sulfoxide (DMSO) mixture by sonication. Covalent attachment process includes dispersing $Fe_3O_4$ nanoparticles in DMSO and further functionalizing with (3-aminopropyl) triethoxysilane (APTES) by reacting under an $N_2$ atmosphere to yield amine-terminated $Fe_3O_4$ (amide formation as a linking bridge).

The π-π interaction process of the invention, includes dispersing $Fe_3O_4$ nanoparticles in an ethanolic solution of 4-mercaptobenzoic acid (4-MBA) linker molecules, then stirring to facilitate either a monodentate or bidentate coordination mode between the terminal carboxylic acid groups of the 4-MBA and corresponding Fe sites localized on $Fe_3O_4$ surfaces. The resulting slurry is then reacted with o-MWNTs through sonication in ethanol and DMSO solvents, resulting in stable π-π interactions between the phenyl rings within the aromatic 4-MBA linker molecules and the underlying conjugated MWNT network.

The inventors have verified that electrodes fabricated with composites synthesized through π-π interaction synthesis process provide for efficient charge transfer due to a presence of a conjugated aromatic system, fast Li-ion diffusion rate owing to a relatively short linker length and a favorable retention of a greater degree of physical integrity after cycling. Since $Fe_3O_4$ has an intermediate voltage, it can be utilized as an anode (when paired with a higher voltage material) or as a cathode (when paired with a lower voltage material).

Examples

Functionalization of MWNTs—Pristine MWNTs (95%, SES Research) are dispersed in concentrated $HNO_3$ by sonication and subsequently heated to 120° C. for 4 h to remove metal catalysts and carbonaceous impurities, and to correspondingly oxidize and coat the surfaces of the MWNTs with oxygenated moieties, such as carboxylic acid functional groups. The resulting purified and oxidized MWNTs (o-MWNTs) were filtered through a 200 nm polycarbonate membrane (Millipore), thoroughly washed with excess water, and ultimately dried at 80° C. for 18 hours.

Synthesis of $Fe_3O_4$ NPs—Magnetite ($Fe_3O_4$) is synthesized using a co-precipitation method similar to that described in S. Zhu, A. C. Marschilok, E. S. Takeuchi, and K. J. Takeuchi, Electrochem. Solid-State Lett., 12, A91 (2009), in which a solution of iron (II) chloride tetrahydrate ($FeCl_2 \cdot 4H_2O$) and iron (III) chloride hexahydrate ($FeCl_3 \cdot 6H_2O$) were added to a solution containing trimethylamine [$N(CH_2CH_3)_3$] under a nitrogen atmosphere. The isolated powder samples were dried prior to subsequent characterization.

Synthesis of $Fe_3O_4$-MWNT Composites—

MWNT-$Fe_3O_4$ synthesized by physical sonication method—Oxidized MWNTs (o-MWNTs) were dispersed in a $H_2O$: dimethyl sulfoxide (DMSO) mixture by sonication to obtain a uniform, well-dispersed black solution. $Fe_3O_4$ aqueous solution was the added to the black solution (o-MWNTs dispersed in a $H_2O$: DMSO mixture) in a drop-wise manner (1 mL/min), and the resulting mixture further sonicated for 2 hours. As-prepared heterostructures were then isolated by vacuum filtration and ultimately dried in a vacuum oven at 80° C.

Figure 1:
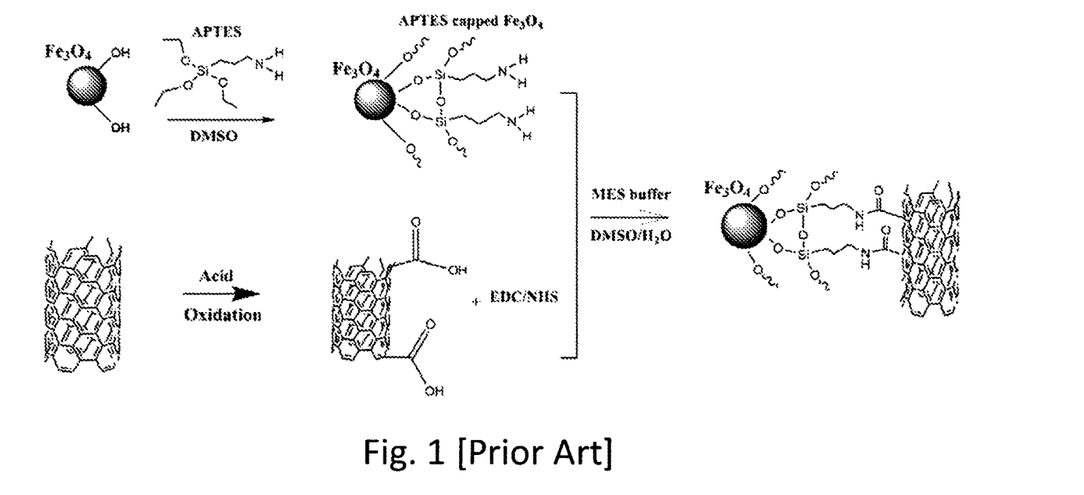
FIG. 1 illustrates a prior art covalent attachment process between magnetite ($Fe_3O_4$) nanoparticles and multi-wall carbon nanotubes (MWNTs)

MWNT-$Fe_3O_4$ synthesized by a "covalent" attachment protocol—As-prepared $Fe_3O_4$ nanoparticles (NPs) were initially dispersed in DMSO and further functionalized with (3-aminopropyl) triethoxysilane (APTES) by reacting at 85° C. for 18 h under a $N_2$ atmosphere, followed by thermal curing at 120° C. for 24 h in $N_2$ in order to generate amine-terminated $Fe_3O_4$. The scheme incorporates: (i) an acid treatment of MWNTs; (ii) surface functionalization of $Fe_3O_4$ with APTES molecules; and (iii) heterostructure generation involving amide formation as the linking bridge between the constituent components, i.e. the MWNTs and the $Fe_3O_4$. The reaction procedures constituting the covalent attachment process are illustrated in FIG. 1.

Specifically, o-MWNTs were dispersed in a $H_2O$: DMSO mixture by sonication, followed by the addition of 1-ethyl-3-(3-dimethylaminopropyl) carbodiimide (EDC) and N-Hydroxysuccinimide (NBS) in 2-morpholinoethanesulfonic acid (MES) buffer. The mixture was sonicated for 1 h, a process allowing for activation of the surface carboxylic groups on the exterior of the o-MWNTs. $NH_2$-terminated $Fe_3O_4$ NPs were dispersed in water to obtain a homogeneous solution and then added into a solution of MWNTs, dropwise with vigorous stirring for 24 h. The product was later collected using vacuum filtration, washed with excessive water, and ultimately dried in a vacuum oven. EDC, NHS, and MES reagents were purchased from Sigma Aldrich, and used without additional purification.

Figure 2:
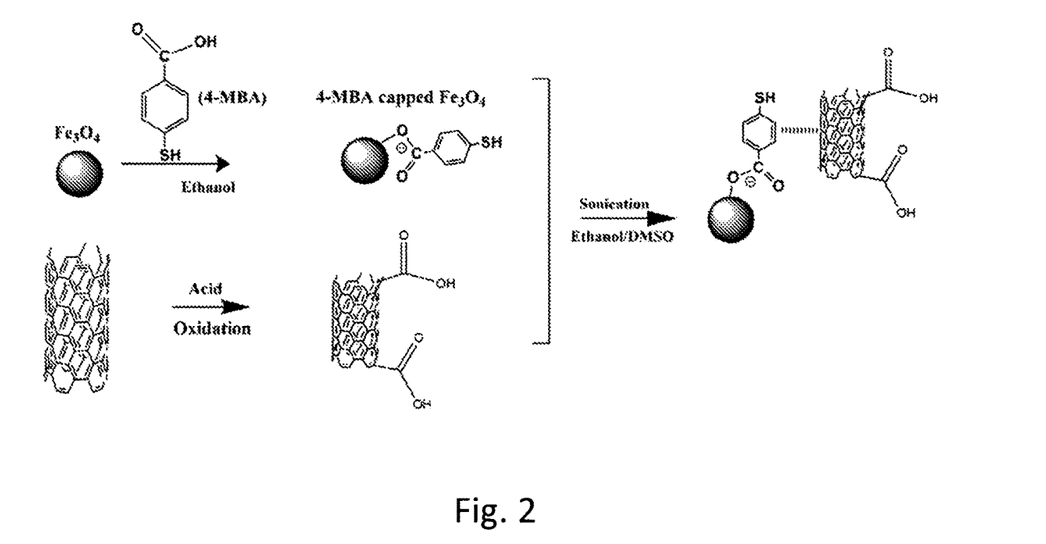
FIG. 2 illustrates the novel π-π interaction attachment process between magnetite ($Fe_3O_4$) nanoparticles and adjoining multi-wall carbon nanotubes (MWNTs), according to the invention.

MWNT-$Fe_3O_4$ synthesized by a π-π interaction synthesis process—The reaction procedures for attachment utilizing the π-π synthesis process of the invention are depicted in FIG. 2. This synthesis process includes dispersing as-synthesized $Fe_3O_4$ nanoparticles (NPs) in an ethanolic solution of 4-mercaptobenzoic acid (4-MBA) (Aldrich, 99%) linker molecules, forming a mixture. The mixture was subsequently stirred at 60° C. for 18 h to facilitate either a monodentate or bidentate coordination mode between the terminal carboxylic acid groups of the 4-MBA and the corresponding Fe sites localized on the $Fe_3O_4$ NP surface. A. Raman, R. Quinones, L. Barriger, R. Eastman, A. Parsi, and E. S. Gawalt, Langmuir, 26, 1747 (2010).

The resulting functionalized product was isolated by vacuum filtration and further washed with ethanol for multiple times to remove any remaining, unbound 4-MBA linkers. The 4-MBA functionalized $Fe_3O_4$ microspheres were further reacted with the oxidized MWNTs (o-MWNTs), through sonication in a mixture of ethanol and DMSO (in a 3:1 volume ratio) solvents for 2 h. This process formed stable π-π interactions between the phenyl rings within the aromatic 4-MBA linker molecules and the underlying conjugated MWNT network. The resulting composites were subsequently vacuum filtered, washed, and ultimately dried in a vacuum oven at 80° C.

Structural Characterization

X-ray diffraction (XRD)—$Fe_3O_4$ samples were characterized by X-ray powder diffraction (XRD) using a Rigaku SmartLab X-ray powder diffractometer. CuKα radiation was utilized with a Bragg-Brentano focusing geometry. The full width at half maximum (FWHM) of the (311) peak was determined using the Peak Fit software. Crystallite sizes were determined using the Scherrer equation after correcting for instrumental broadening using a lanthanum hexaboride (LaB6) standard. P. Scherrer, Nachr. Ges. Wiss. Gottingen, 96 (1918).

Electron microscopy—As-synthesized $Fe_3O_4$-MWNT samples prepared by the three different attachment protocols were dispersed in ethanol and sonicated for 2 minutes to ensure a uniform dispersion. One drop of the solution was evaporated onto a 300 mesh Cu grid, which was coated with a lacey carbon film. TEM characterization, including data associated with morphology and selected area electron diffraction, was performed on a JEOL JEM 2100F TEM instrument, equipped with a field-emission electron gun operating at 200 kV and a high-resolution pole-piece with a 0.19 nm point-to-point resolution.

Thermo-gravimetric analysis (TGA)—Data were acquired using a TGA Q500 instrument over a relatively broad temperature range spanning from 30 to 800.0 under an air atmosphere, using a set heating rate of 10° C./min.

FT-mid-IR—Relevant data were obtained on a Nexus 670 (Thermo Nicolet) spectrometer equipped with a single-reflectance zinc selenide (ZnSe) ATR accessory, a KBr beam splitter, and a DTGS KBr detector. Specifically, solid samples were placed onto a ZnSe crystal. Measurements were obtained in reflectance mode by using the Smart Performer module.

Electrochemical Methods

Preparation of $Fe_3O_4$ electrodes—Tape cast electrodes of $Fe_3O_4$-MWNT were prepared on copper foil using a combination of 80% active material (MWNT-$Fe_3O_4$ 50 wt % heterostructures), 10% carbon black, 7% polyvinylidene fluoride (PVDF) binder, and 3% graphite by weight. A control sample was prepared by physically mixing together 40% $Fe_3O_4$, 40% MWNT, 10% carbon black, 7% PVDF, and 3% graphite by weight.

Electrochemical testing—The electrodes prepared as noted above were used to assemble two-electrode coin type cells. The cells were assembled using a lithium foil electrode and an electrolyte containing 1.0 M of lithium hexafluorophosphate ($LiPF_6$) in ethylene carbonate and dimethyl carbonate (30/70, v/v).

Cycling tests were conducted using a Maccor Battery Tester at 30° C. Lithium/magnetite (Li/$Fe_3O_4$) cells were initially discharged to 0.2 V at a C/10 (92.6 mA/g) discharge rate for 30 cycles, followed by a rate capability test with discharge rates applied in the sequence of 200, 400, 800, 100, 1200, 1600, and 2000 mA/g with the C/10 rate used again for the next 50 cycles. All of the charge rates were set at C/10 using voltage limits of 0.2 and 2.5 V. Cyclic voltammetry (CV) data were collected using a two-electrode configuration wherein the reference and counter electrodes were both lithium metal. Voltage limits for the CV test were 0.1 V and 2.5 V at a scan rate of 0.1 mV/s. Electrochemical impedance spectroscopy (EIS) data were collected over a frequency range of 100 kHz to 10 mHz with a 10 mV amplitude.

Results and Analysis:

In these examples, we demonstrated that $Fe_3O_4$ nanoparticles (NPs) with an average size of 8-10 nm and a loading ratio of 50 wt % have been successfully attached onto the external surfaces of multi-walled carbon nanotubes (MWNTs) by means of three different preparative approaches, namely a sonication method, a covalent attachment protocol, as well as a π-π interaction strategy. Specifically, the $Fe_3O_4$ NPs associated with the sonication method lie directly on the outer surfaces of the MWNTs. Particles covalently attached onto the MWNTs formed amide chemical bonds through the mediation of the amorphous (3-minopropyl) triethoxysilane (APTES) linker. Finally, particles were anchored onto the underlying conjugated MWNTs via an aromatic 4-mercaptobenzoic acid (4-MBA) linker.

Both structural and electrochemical characterization protocols have been used to systematically correlate the electrode performance with the corresponding attachment strategies. $Fe_3O_4$-MWNT composites generated by the π-π interaction strategy delivered 813, 768, 729, 796, 630, 580, 522, and 762 mAh/g under rates of 200, 400, 800, 100, 1200, 1600, 2000, and 100 mA/g, with 72% retention between cycles 2 and 80, demonstrating both higher capacity and better cycling stability as compared with analogues derived from the physical sonication as well as covalent attachment strategies. This finding may be attributed to the enhanced charge and ion transport coupled with retention of physical contact with the underlying MWNTs after a large volume change during cycling. Our collective results suggest that the π-π attachment modality is a more effective preparative strategy for enhancing the performance of MWNT-$Fe_3O_4$ composite electrodes after a full discharge process.

Structure and morphology of the MWNT-$Fe_3O_4$ Heterostructures—Pristine MWNTs, obtained from SES Research, possess an overall nanotube content of 95 wt %, and measure 10-30 nm in diameter as well as ~1-2 µm in length. The major impurities in the pristine MWNTs consist of amorphous carbon. After chemical functionalization, the oxidized MWNTs evince a relatively clean tube-like morphology with no observable impurities. The XRD pattern of as-prepared $Fe_3O_4$ NPs was recorded and showed excellent correspondence to a literature pattern of $Fe_3O_4$. In this study, all of the magnetite powder samples possessed crystallite sizes of 8-10 nm.

Figure 3A:
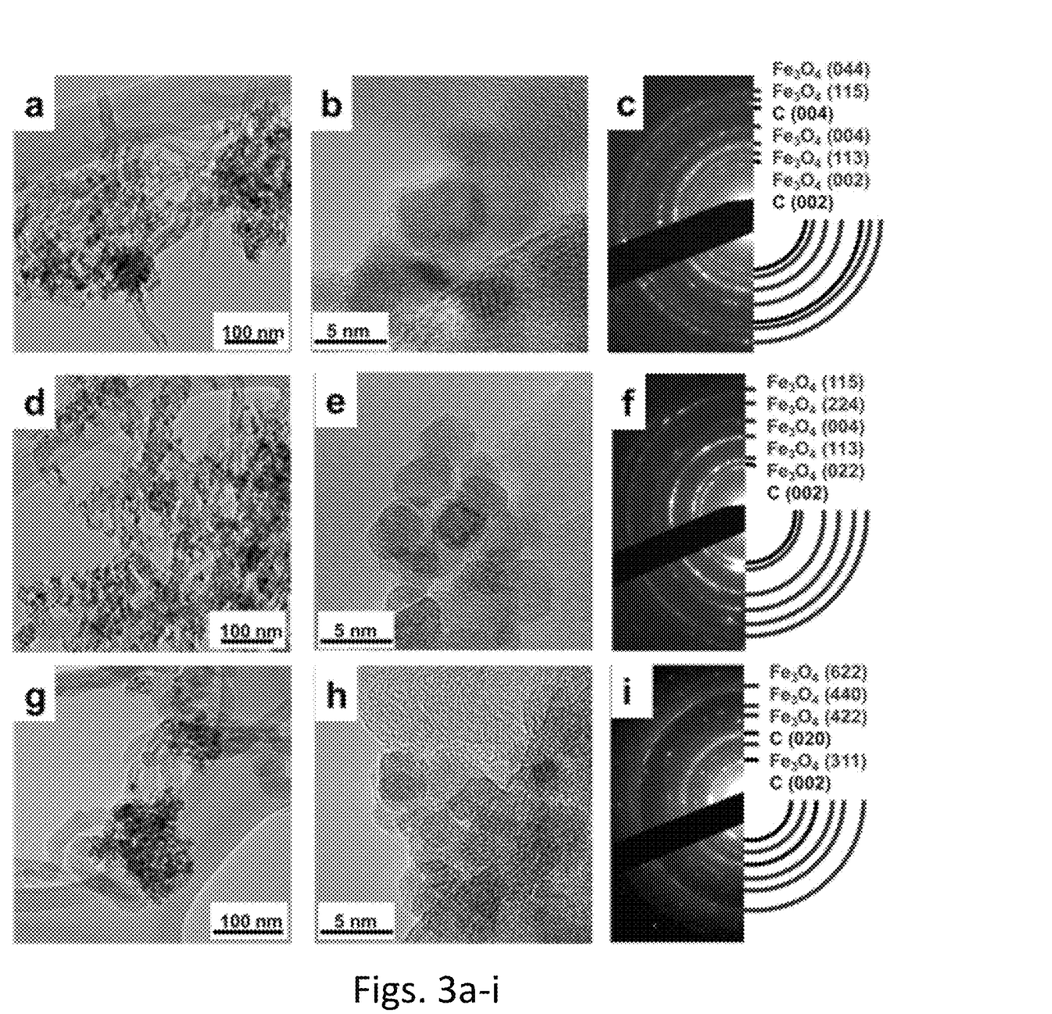
FIG. 3a is a TEM image depicting morphology at 100 nm of the $Fe_3O_4$-MWNT composites with a 50 wt % of $Fe_3O_4$ loading, synthesized by the covalent attachment protocol of FIG. 1.

FIGS. 3a-c are images depicting morphology, at 100 nm (FIG. 3a) and 10 nm (FIG. 3b) and phase (FIG. 3c) of $Fe_3O_4$-MWNT composites with a 50 wt % of $Fe_3O_4$ loading, synthesized by the covalent attachment protocol. FIGS. 3d-f are images depicting morphology, at 100 nm (FIG. 3d) and 10 nm FIG. 3e) and phase (FIG. 3f) of $Fe_3O_4$-MWNT composites with a 50 wt % of $Fe_3O_4$ loading, synthesized by physical sonication. FIGS. 3g-i are images depicting morphology, at 100 nm (FIG. 3g) and 10 nm FIG. 3h) and phase (FIG. 3i) of $Fe_3O_4$-MWNT composites with a 50 wt % of $Fe_3O_4$ loading, synthesized by the π-π interaction procedure.

The $Fe_3O_4$ loading ratio in each composite formed by the three respective methods was confirmed by TGA profile, where nearly all of the $Fe_3O_4$ NPs were found to be 8-10 nm, and preferentially adhered onto external surfaces of the MWNTs.

The spatial distribution of $Fe_3O_4$ NPs is more uniformly dispersed and these NPs are in direct contact with the underlying MWNTs in the composite generated by sonication (FIG. 3d). By contrast, a more uneven, aggregated and cluttered distribution of NPs is found in heterostructures prepared using the covalent-attachment method (FIG. 3a) and the π-π interaction synthesis process protocol (FIG. 3g). High resolution TEM images show that the $Fe_3O_4$ NPs associated with the sonication method lie directly on the outer surface of the MWNTs (FIG. 3c), whereas covalently attached particles apparently and presumably show a presence of AOTES coating (FIG. 3b). Selected area electron diffraction (SAED), as presented in FIGS. 3c, 3f and 3i, confirm that the NPs within the heterostructures synthesized by all three methods can be ascribed to pure magnetite phase.

Electrodes fabricated with composites synthesized through π-π interaction synthesis process provide for efficient charge transfer due to a presence of a conjugated aromatic system, fast Li-ion diffusion rate owing to a relatively short linker length and a favorable retention of a greater degree of physical integrity after cycling. Using both structural and electrochemical characterization protocols, the 3 attachment modalities were correlated to the corresponding electrode (fabricated with composite material synthesized by the 3 attachment methods or modalities) performances.

The observed differences are understood to be due to the attachment strategy employed. Physical sonication induces adsorption of nanoparticles (NPs) onto the MWNT surface, where inherently weak and more randomized van der Waals interactions exist between the NPs and the MWNTs. Consequently, these randomized van der Waals interactions may be more easily destroyed upon rigorous processing of the resulting nanocomposite, i.e., by the full discharge process.

By contrast, electrodes formed with $Fe_3O_4$-MWNT composites generated by attaching the $Fe_3O_4$ to the MWNTs, through the mediation of bridging 4-mercaptobenzoic acid (4-MBA) linker molecules, is found to promote (i) an efficient charge transfer process due to the presence of a conjugated aromatic system, (ii) a fast Li-ion diffusion rate, owing to a relatively short length of the linker, and (iii) favorable retention of a greater degree of physical integrity after cycling.

Figure 4:
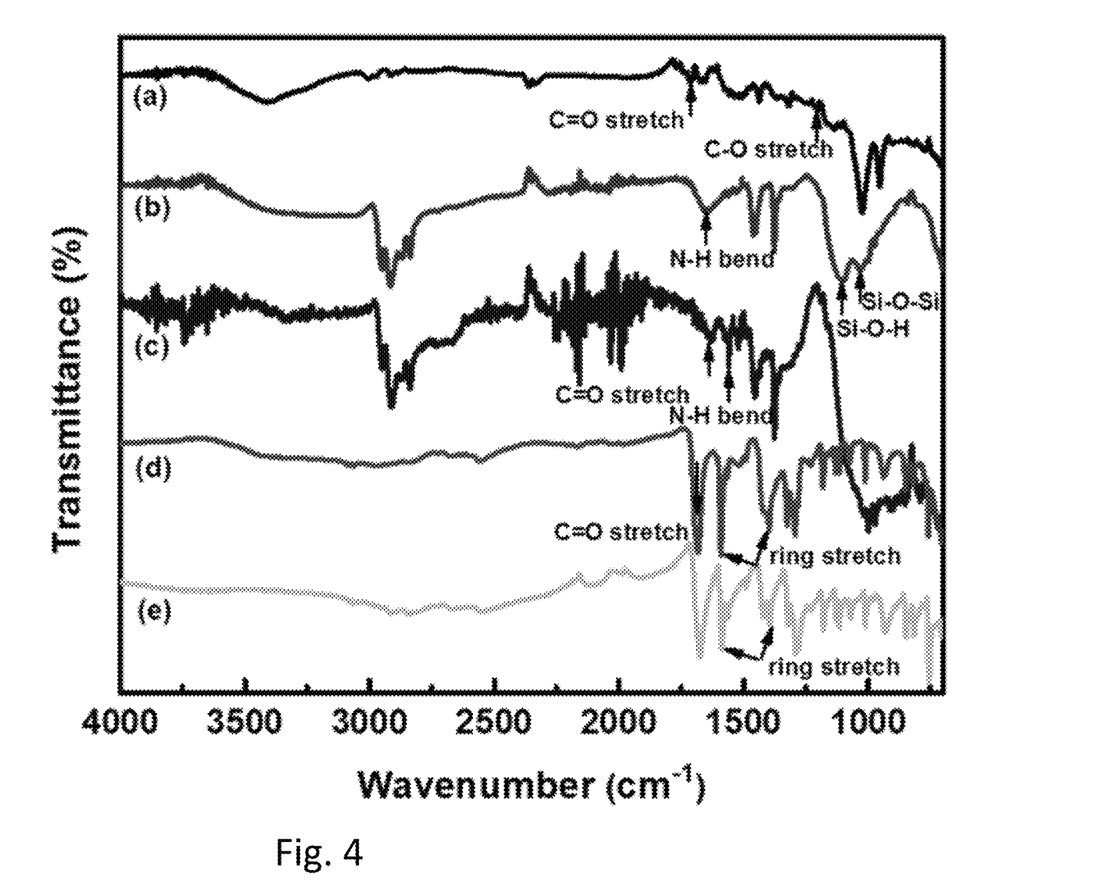
FIG. 4 depicts IR spectra of (a) oxidized MWNTs, (b) APTES-functionalized $Fe_3O_4$, (c) MWNT-50 wt % $Fe_3O_4$ heterostructures synthesized by the covalent attachment process of FIG. 1, (d) 4-MBA functionalized $Fe_3O_4$, (e) MWNT-50 wt % $Fe_3O_4$ heterostructures synthesized using π-π interaction process of FIG. 2.

The FT-IR spectra of o-MWNTs, of APTES and 4-MBA functionalized $Fe_3O_4$, and covalently-formed and π-π stacking formed MWNT-50 wt % $Fe_3O_4$ composites are depicted in FIG. 4 (a-e, respectively). The IR spectra shown in (a) of FIG. 4 confirms the success of acid functionalization of the MWNTs (Y. Si and E. T. Samulski, Nano Lett., 8, 1679 (2008).), where the IR spectra in (b) of FIG. 4 confirms effective functionalization with APTES. R. Villalonga, M. L. Villalonga, P. Diez, and J. M. Pingarron, J. Mater. Chem., 21, 12858 (2011). IR spectra depicted in (c) of FIG. 4 confirms formation of a chemical bond between the MWNTs and the $Fe_3O_4$. IR spectra depicted in (d) confirms successful functionalization (C+O bond associated with the 4-MBA linker) and that of (e) of FIG. 4 confirms that the attachment is the result of strong π-π stacking interactions between the phenyl ring in the MBA linker and the underlying conjugated MWNT network.

The 4-MBA coated $Fe_3O_4$ sample (see (d) of FIG. 4) gave rise to a sharp peak located at 1680 cm−1, corresponding to the stretching mode of the C=O bond associated with the 4-MBA linker. Peaks located at 1592 and 1400 cm−1 are due to the phenyl ring stretching mode derived from 4-MBA, an observation suggestive of a successful functionalization process. After attaching MBA-coated $Fe_3O_4$ onto the MWNTs (see (e) of FIG. 4), the two ring stretching peaks shifted from 1592 and 1400 cm−1 to 1589 cm−1 and 1394 cm−1, respectively, a result which was likely induced mainly by the presence of strong π-π stacking interactions between the phenyl ring within the MBA linker and the underlying conjugated MWNT network. This shift implies a 'softening' of the C=C bonds, and has been linked to an expansion of the C—C bonds. D.-Q. Yang, J.-F. Rochette, and E. Sacher, J. Phys. Chem. B, 109, 4481 (2005); Y. Zhang, S. Yuan, W. Zhou, J. Xu, and Y. Li, J. Nanosci. Nanotechnol., 7, 2366 (2007).

Figure 5A:
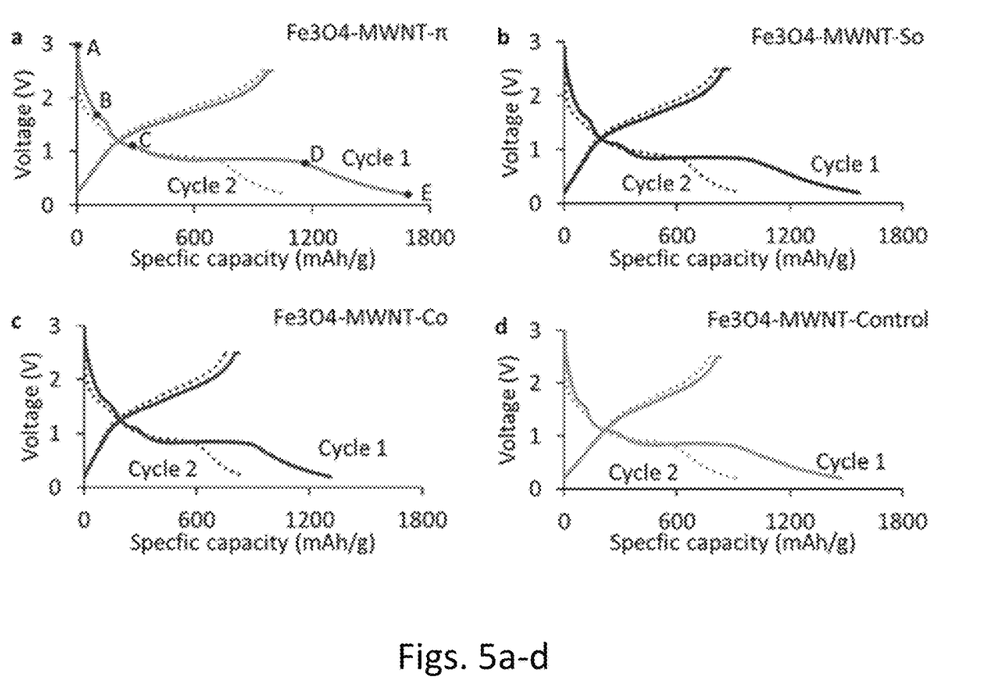
FIG. 5a depicts first and second discharge and charge profiles of cells containing the $Fe_3O_4$-MWNT composite electrodes formed by π-π synthesis process of FIG. 2 tested at a C/10 rate.

Electrochemical evaluation of $Fe_3O_4$-MWNT composite heterostructures—Cells prepared using a two electrode configuration with the three variously prepared MWNT-$Fe_3O_4$ composites, generated by sonication ($Fe_3O_4$-MWNT-So, 50% of $Fe_3O_4$ wt.), covalent attachment ($Fe_3O_4$-MWNT-Co, 50% of $Fe_3O_4$ wt.) and π-π interaction synthesis process ($Fe_3O_4$-MWNT-π, 50% of $Fe_3O_4$ wt.), were discharged to 0.2 V and then charged to 3.0 V at a C/10 rate (IC=926 mAh/g). FIGS. 5a-d highlight the first two discharge/charge cycles profiles of all three of the cells together with that of the control sample, as shown, respectively. All of the $Fe_3O_4$-MWNT samples are found to evince similar discharge/charge profiles. FIG. 5a in particular indicates some critical points during the initial discharge process of $Fe_3O_4$.

$Fe_3O_4$ possesses an inverse spinel structure, with $Fe^{3+}$ occupying tetrahedral sites (Wyckoff position 8a). The octahedral sites (Wyckoff position 16d) are occupied by both $Fe_3+$ and $Fe_2+$ in a cubic close packed array of $O^{2-}$ ions. M. E. Fleet, J. Solid State Chem., 62, 75 (1986).

During the initial stage of lithiation (x<2, where 'x'=lithiation amount), $Li^+$ ions insert into vacant octahedral (16c) sites. M. M. Thackeray, W. I. F. David, and J. B. Goodenough, Mater. Res. Bull., 17, 785 (1982); J. Fontcuberta, J. Rodriguez, M. Pernet, G. Longworth, and J. B. Goodenough, J. Appl. Phys., 59, 1918 (1986).

At low $Li^+$ concentrations, 8a Fe ions are displaced into the 16c site by electrostatic repulsion. Additional Li ions fill the octahedral holes (16c) and the now empty tetrahedral holes. The result of this initial electrochemical insertion mechanism is the transformation of the $A[B_2]O_4$ spinel phase into a $(LiA)[B_2]O_4$ rock salt type phase. The initial lithiation via the insertion mechanism yields a theoretical capacity of 230 mAh/g of $Fe_3O_4$. Further lithiation is proposed to form $Li_2O$ and Fe metal, as supported by recent X-ray absorption spectroscopy results. M. C. Menard, K. J. Takeuchi, A. C. Marschilok, and E. S. Takeuchi, Phys. Chem. Chem. Phys., 15, 18539 (2013).

From points A to B, less than one Li+ ion can get into $Fe_3O_4$. At this level of lithiation, a rock salt type phase $Li_xFe_3O_4$ (0<'x'<2) is formed and at this discharge level, the lithiation process occurs via the insertion mechanism. The cubic close packed array of oxygen atoms remains intact. After lithiation of more than 2 equivalents of electrons (>point C), the conversion reaction becomes the dominant lithiation mechanism and is accompanied by dramatic structural changes during the advanced discharge process. This proposed transformation process can occur through the formation of a $(LiA)[B_2]O_4$ rock salt type phase followed by conversion to Fe metal, thereby resulting in an additional 690 mAh/g of capacity. W. Zhang, D. C. Bock, C. J. Pelliccione, Y. Li, L. Wu, Y. Zhu, A. C. Marschilok, E. S. Takeuchi, K. J. Takeuchi, and F. Wang, Adv. Energy Mater., (2016).

The majority of the $Fe_3O_4$ conversion likely takes place between points C and D. The heterostructure incorporating MWNT starts to contribute additional capacity to the initial discharge at ~0.8 V, in which the large irreversible capacities measured for $Fe_3O_4$-MWNT at cycle 2 are consistent with the formation of a solid electrolyte interface (SEI) at low voltage. D. T. Welna, L. Qu, B. E. Taylor, L. Dai, and M. F. Durstock, J. Power Sources, 196, 1455 (2011); Y. W. E. P. B. Balbueng, Lithium-Ion Batteries: Solid Electrolyte Interphase, Imperial College Press, London (2004).

Among the four types of cell generated, the $Fe_3O_4$-MWNT-$\pi$ sample yielded the highest initial capacity at ~1700 mAh/g. By contrast, the analogous capacities of $Fe_3O_4$-MWNT-So heterostructures, $Fe_3O_4$-MWNT-Co heterostructures, and physically mixed $Fe_3O_4$-MWNT control samples were noticeably lower, and in fact, were measured to be ~1600 mAh/g, ~1350 mAh/g, and 1500 mAh/g, respectively (FIG. 5a-d). This trend was also observed in the 2nd cycle (FIG. 5a-d), wherein the highest capacity was observed with the $Fe_3O_4$-MWNT-$\pi$ sample, as compared with all other types of attachment modalities analyzed.

Figure 6:
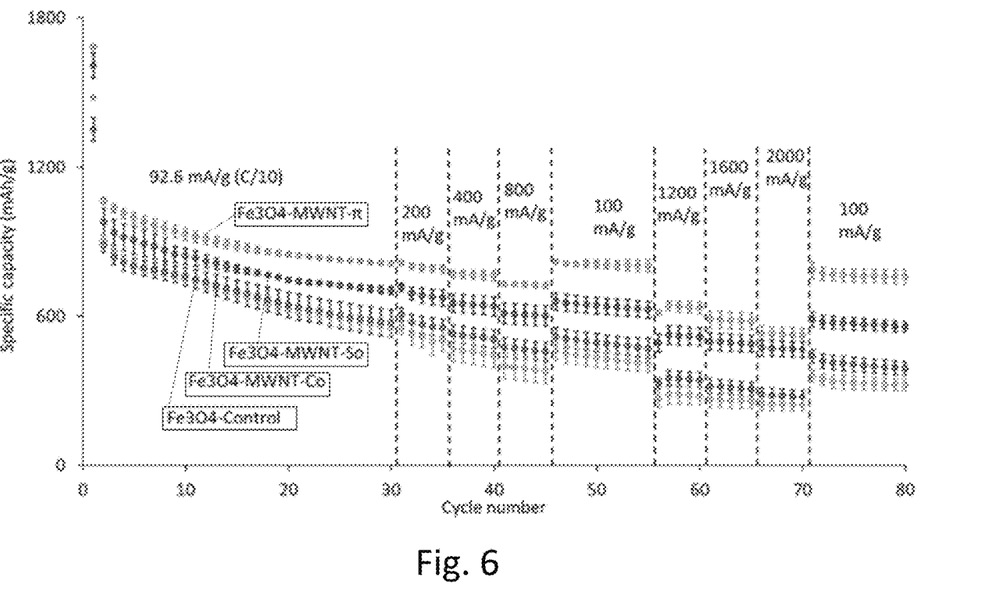
FIG. 6 is a graph depicting average specific capacity versus cycle number of the cells fabricated by the $Fe_3O_4$-MWNT-π composite, the $Fe_3O_4$-MWNT-So composite, the $Fe_3O_4$-MWNT-Co composite and the $Fe_3O_4$-MWNT-Control composite.
Figure 7A:
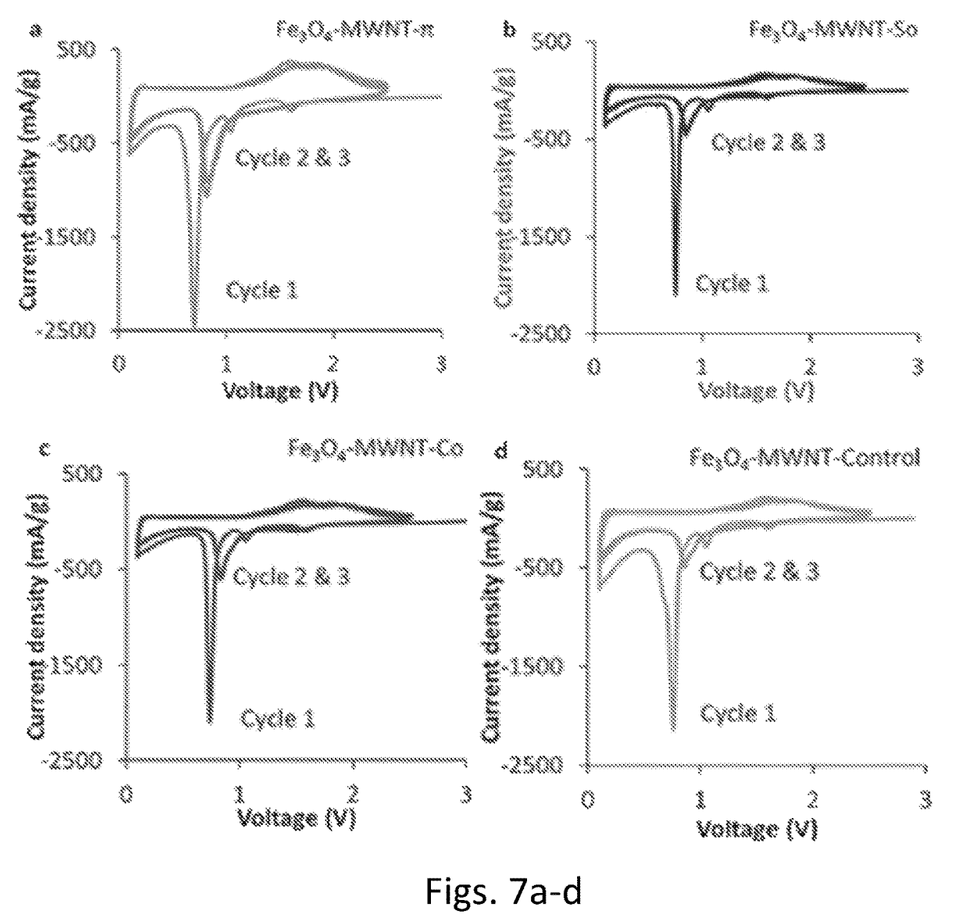
FIG. 7a depicts CV results of $Fe_3O_4$-MWNT-π heterostructure at a 0.1 mV/s scan rate.

Specific capacity versus cycle number. The average specific capacity versus cycle number of the cells is shown in FIG. 6. A total of 80 cycles using sequential rates of C/10 (92.6 mA/g), 100, 200, 400, 8OO, 1200, 1600, and 2000 mA/g rate were tested. A galvanostatic cycling test with a C/10 rate was applied for the first 30 cycles to evaluate the reversibility of different $Fe_3O_4$-MWNT attachment modalities. The $Fe_3O_4$-MWNT-$\pi$ sample delivered ~1100 mAh/g in cycle 2 and ~S50 mAh/g in cycle 30 (80% retention). The other analogous samples yielded less capacity and demonstrated a lower capacity retention. For example, the $Fe_3O_4$-MWNT-So heterostructures yielded ~916 mAh/g on cycle 2 but only ~718 mAh/g in cycle 30 (i.e. ~73% retention). The $Fe_3O_4$-MWNT-Co heterostructures gave rise to ~883 mAh/g on cycle 2 but merely about 570 mAh/g on cycle 30 (i.e. 65% retention). Finally, the physically mixed $Fe_3O_4$-MWNT control samples furnished ~900 mAh/g in cycle 2 but a much lower about 553 mAh/g with cycle 30 (i.e. 61% retention).

Hence, the $\pi$-$\pi$ stacking $Fe_3O_4$-MWNT materials delivered not only higher capacity but also exhibited better capacity retention as compared with the series of physically sonicated, covalently attached, and control samples over 30 cycles. After 30 cycles, the second rate capability test was applied. The discharge rates were increased between 200 mA/g to 2000 mA/g, while the charge rates for all cycles were maintained at C/10 (92.6 mA/g) until the $80^{th}$ cycle. As the rates were increased, larger differences in capacities were observed for the cells with different modes of $Fe_3O_4$-MWNT attachment. Notably, the $Fe_3O_4$-MWNT-$\pi$ sample exhibited both higher capacity and capacity retention as compared with the series of physically sonicated, covalently attached, and control samples after 30 cycles. In particular, the $Fe_3O_4$-MWNT-$\pi$ sample gave rise to 813, 76S, 729, 796, 630, 580, 522, and 762 mAh/g under rates of 200, 400, 800, 100, 1200, 1600, 2000, and 100 mA/g, with 72% retention after 80 cycles.

The corresponding data for the other samples tested can be summarized as follows. The $Fe_3O_4$-MWNT-So heterostructures yielded 733, 665, 624, 658, 492, 497, 472, and 576 mAh/g; the $Fe_3O_4$-MWNT-Co heterostructures delivered 606, 528, 474, 519, 330, 318, 285, and 418 mAh/g; and finally, the physically mixed control samples produced 556, 467, 399, 460, 269, 265, 246, and 360 mAh/g at cycles 31, 36, 41, 45, 56, 61, 66, and 71, respectively. In addition, there was less capacity variation for the cells derived from the $Fe_3O_4$-MWNT-$\pi$ sample, during the cycling testing, as compared with the other types of CNT attachment.

In effect, the $Fe_3O_4$-MWNT-$\pi$ sample compared favorably with what has been previously reported in the literature. Specifically, the $Fe_3O_4$-MWNT-$\pi$ sample was found to deliver higher capacities than both (i) the porous $Fe_3O_4$/MWCNT composites generated by Pang, et al., which yielded 601 mAh/g and 450 mAh/g under rates of 100 and 2000 mA/g (X.-J. Pang, J. Zhang, G.-W. Qi, X.-H. Dai, J.-P. Zhou, and S.-Y. Zhang, J. Alloys Compd., 640, 8 (2015)), as well as (ii) the MWCNT-$Fe_3O_4$-rGO nanocomposites, developed by Yang, et al., which produced measured capacities of 680 mAh/g and 250 mAh/g under rates of 200 and 1200 mA/g. S. Yang, C. Cao, G. Li, Y. Sun, P. Huang, F. Wei, and W. Song, Nano Research, 8, 1339 (2015).

Cyclic voltammetry—In order to further probe the implications of the different attachment modalities, cyclic voltammetry (CV) data of the $Fe_3O_4$-MWNT samples, generated using $\pi$-$\pi$ stacking, sonication, and covalent attachment protocols, were collected and analyzed in the context of $Li^+$ insertion/extraction as well as of $Fe_3O_4$ conversion, as depicted in FIGS. 7a-f, as shown, respectively. The first three cycles were scanned at 0.1 m V/s within a voltage window of 0.1 and 2.5 V. The $\pi$-$\pi$ stacking, sonication-mediated, and covalently attached $Fe_3O_4$-MWNT cells gave rise to three peaks located at about 1.7 V, ~1.2 V, and 0.7 V for the initial discharge step. This observation is consistent with the galvanostatic initial discharge step characterized by three discharge plateaus.

With respect to a comparison of the two composites derived from the use of different chemical linkers, i.e. APTES and 4-MBA, the MBA-mediated, $\pi$-$\pi$ stacked $Fe_3O_4$-MWNT-$\pi$ cell possesses a sharper cathodic peak at about 2500 mA/g with a peak positioned at ~0.7 V as compared with the corresponding cathodic peak of the APTES-derived, covalently attached $Fe_3O_4$-MWNT-Co structure, at about 0.74 V at about 2100 mA/g. The observation of a "sharp" cathodic peak can be explained by the conversion of $Fe_3O_4$ to Fe and the formation of $Li_2O$ in addition to some irreversible reaction of electrolyte. D. C. Bock, K. C. Kirshenbaum, J. Wang, W. Zhang, F. Wang, J. Wang, A. C. Marschilok, K. J. Takeuchi, and E. S. Takeuchi, ACS Appl. Mater. Interfaces, 7, 13457 (2015).

A broad anodic peak was observed at ~1.80 V, corresponding to the reversible oxidation of $Fe^°\rightarrow Fe^{2+}$ during the anodic process. In the $2^{nd}$ cycle (FIG. 7a-d), both reduction and oxidation peaks were shifted to more positive voltages, thereby indicating an increased polarization of the electrode materials in the initial cycles. L. Ji, Z. Tan, T. R. Kuykendall, S. Aloni, S. Xun, E. Lin, V. Battaglia, and Y. Zhang, Phys. Chem. Chem. Phys., 13, 7170 (2011). The $\pi$-$\pi$ stacked, $Fe_3O_4$-MWNT heterostructures exhibit higher peak currents as compared with their covalently-attached $Fe_3O_4$-MWNT heterostructure counterparts.

In order to explain the better electrode performance associated with the $Fe_3O_4$-MWNT-$\pi$ heterostructure sample, as compared with the other three analogues, the structural differences amongst the various $Fe_3O_4$-MWNT composites prepared using different attachment modalities were considered. Specifically, the conjugated 4-MBA linker contains an aromatic $\pi$-electron system together with terminal carboxylic acid and thiol groups; it possesses the characteristics of a conductive binder. Not surprisingly, MBA molecules have been used in surface enhanced Raman scattering applications associated with silver and gold (A. Michota and J. Bukowska, J. Raman Spectrosc., 34, 21 (2003); F. Wang, R. G. Widejko, Z. Yang, K. T. Nguyen, H. Chen, L. P. Fernando, K. A. Christensen, and J. N. Anker, Anal. Chem., 84, 8013 (2012), as well as in the context of self-assembled monolayers (SAMs) for bio-sensing. S. M. Rosendahl and I. J. Burgess, Electrochim. Acta, 53, 6759 (2008). It is believed that there have been no studies considering the application of MBA in battery electrode design.

In the inventive method, the MBA-coated $Fe_3O_4$ attaches onto MWNTs through $\pi$-$\pi$ electron conjugated interactions, which allow for more efficient electron transfer between the 2 species. This results in a lower charge transfer resistance. By contrast, covalently-produced $Fe_3O_4$-MWNT heterostructures were prepared using bulky, long-chain, and insulating APTES linkers in order to chemically connect the $Fe_3O_4$ NPs with the pendant carboxylic groups on the functionalized MWNTs. A prior report examined the use of the APTES linker for $Fe_3O_4$ immobilized onto a glassy carbon substrate and reported on an increased charge transfer resistance due to the presence of the linker. H. Yin, Y. Zhou, T. Liu, T. Tang, S. Ai, and L. Zhu, J. Solid State Electrochem., 16, 731 (2012).

In addition, additional studies suggest that the presence of unwieldy, bulky, and non-conjugated ligands can act to deter charge transport between adjacent nanoparticles and nanostructures. L. Wang, J. Han, B. Sundahl, S. Thornton, Y. Zhu, R. Zhou, C. Jaye, H. Liu, Z. Q. Li, G. T. Taylor, D. A. Fischer, J. Appenzeller, R. J. Harrison, and S. S. Wong, Nanoscale, 8, 15553 (2016); T. Virgili, I. S. Lopez, B. Vercelli, G. Angella, G. Zotti, J. Cabanillas-Gonzalez, D. Granados, L. Luer, R. Wannemacher, and F. Tassone, J. Phys. Chem. C, 116, 16259 (2012).

By contrast with their non-conjugated counterparts, the presence of electron-rich, conjugated systems, such as the 4-MBA in our work, is more efficacious at enabling, assisting, and ultimately promoting the charge transfer process. Thus, a higher specific capacity of the $Fe_3O_4$-MWNT-$\pi$ cells as compared with their $Fe_3O_4$-MWNT-Co cell analogues can be rationalized as emanating from the reduced charge transfer resistance, due to the presence of the aromatic 4-MBA linkage. When comparing the performance of sonication-mediated $Fe_3O_4$-MWNT heterostructures as well as of the $Fe_3O_4$-MWNT-control composites, the $Fe_3O_4$-MWNT-$\pi$ heterostructure sample delivered not only a higher capacity but also a better cycling stability, understandably due to more robust and stabilizing interactions between the $Fe_3O_4$ and the adjoining MWNTs, made possible by the presence of the 4-MBA linker molecules. The $Fe_3O_4$-MWNT-$\pi$ cells understandably, readily accommodate for the drastic volume change occurring during the cycling process itself.

Figures 8A, 8B:
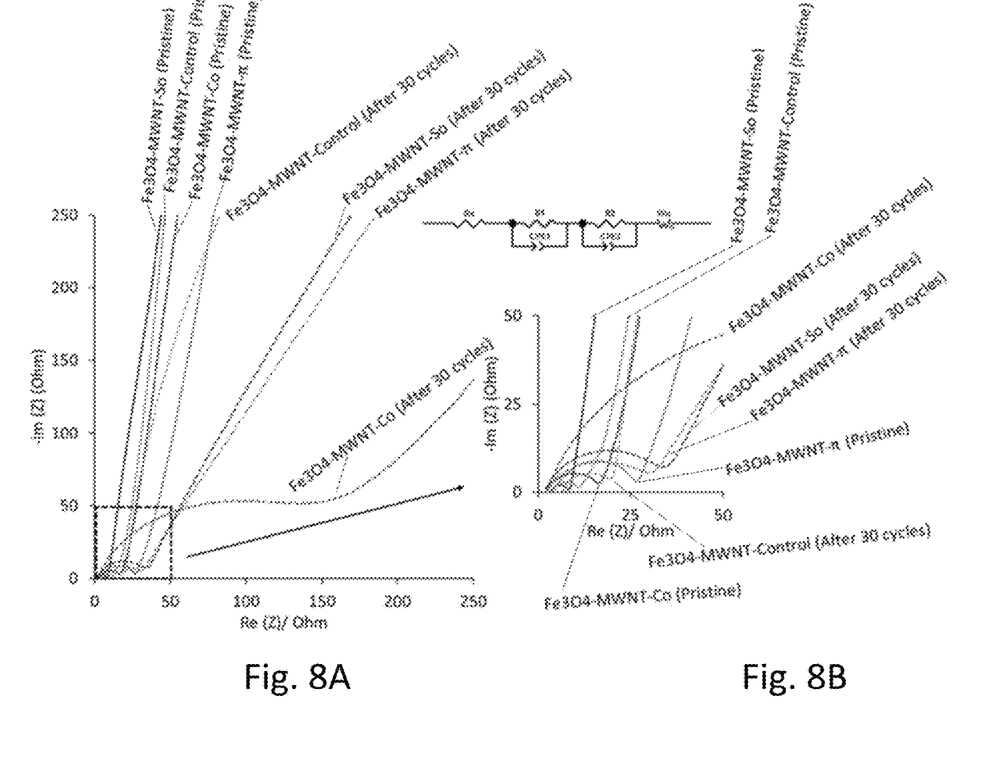
FIG. 8A depicts an EIS Nyquist plot of the respective synthesized $Fe_3O_4$-MWNT-π, $Fe_3O_4$-MWNT-So, $Fe_3O_4$-MWNT-CO and $Fe_3O_4$-MWNT-control heterostructures at a 0.1 mV/s scan heterostructures collected before 30 galvanostatic cycles at a C/10 rate.
FIG. 8B depicts an EIS Nyquist plot of the respective FIG. 8A synthesized heterostructures collected after 30 galvanostatic cycles at the C/10 rate, and including an equivalent circuit used to fit the results.

Electrochemical impedance spectroscopy (EIS)—EIS data were collected before and after 30 galvanostatic cycles for the $Fe_3O_4$-MWNT-$\pi$, $Fe_3O_4$-MWNT-So, $Fe_3O_4$-MWNT-Co and $Fe_3O_4$-MWNT-control heterostructures to gain insight into the reaction kinetics and the effect of the different attachment methods (used to synthesize the respective composites) on the transfer of lithium ions. FIGS. 8A and 8B depict EIS Nyquist plots of the respective synthesized heterostructures collected before and after 30 galvanostatic cycles. An equivalent circuit (part of FIG. 8B) was used to fit the results. As shown, the sum of R1 and R2 represents the charge transfer resistance $R_{ct}$; CPE is the constant phase element; and $W_o$ is the Warburg impedance. Before cycling of the cells, the EIS data showed that the $Fe_3O_4$-MWNT-$\pi$ (~23Ω), $Fe_3O_4$-MWNT-So (~11Ω), $Fe_3O_4$-MWNT-Co (~15Ω), and $Fe_3O_4$-MWNT-Control (about 11Ω) samples gave rise to small semicircles, thereby indicating all materials had relatively small $R_{ct}$ values before electrochemical cycling.

All of the cells nevertheless revealed larger $R_{ct}$ values after 30 cycles. Notably, the $R_{ct}$ values of the $Fe_3O_4$-MWNT-Co heterostructures increased more significantly as compared with the other samples to a value of ~145Ω. By contrast, $Fe_3O_4$-MWNT-$\pi$ exhibited a $R_{ct}$ value of only ~30Ω. These data indicate that the $Fe_3O_4$-MWNT-$\pi$ heterostructure sample possessed smaller charge transfer resistance values as compared with the corresponding sonication-mediated $Fe_3O_4$-MWNT-So and covalently processed $Fe_3O_4$-MWNT-Co samples.

Figure 9A:
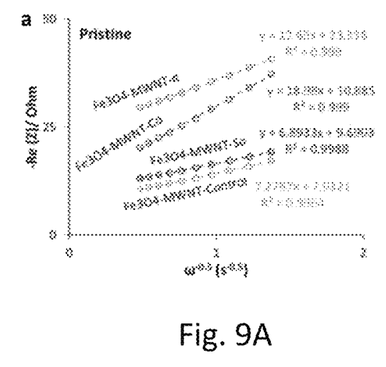
FIG. 9A depicts $Z_{re}$ versus $\omega^{-0.5}$ data associated with electrodes formed with the respective synthesized $Fe_3O_4$-MWNT-π, $Fe_3O_4$-MWNT-So, $Fe_3O_4$-MWNT-CO and $Fe_3O_4$-MWNT-control composites of the samples analyzed, before 30 cycles of testing.
Figure 9B:
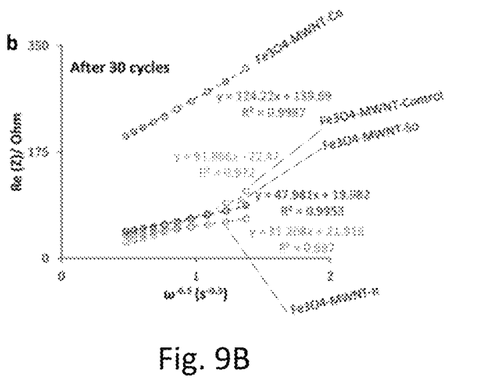

The EIS and $Z_{re}$ versus $\omega^{-0.5}$ data associated with the electrodes corresponding to all of the $Fe_3O_4$-MWNT-$\pi$, $Fe_3O_4$-MWNT-So, $Fe_3O_4$-MWNT-Co and $Fe_3O_4$-MWNT-control heterostructures samples analyzed, before and after 30 cycles, are shown in FIGS. 9A and 9B, respectively. By comparing the behavior of cells before and after 30 cycles, a trend of increasing slope for the Warburg impedance (σ) was observed for each of the samples. The diffusion coefficients calculated from Equations 1 and 2 below indicate that the larger the σ, the smaller the magnitude of the lithium ion diffusion coefficient for the $Fe_3O_4$-MWNT materials. The fitting summary for $R_s$, $R_{ct}$, σ, as well as the diffusion coefficient number ($D_{Li}^+$) for all of the materials analyzed has been put together. The fitting results suggest that the $Fe_3O_4$-MWNT-$\pi$ heterostructure sample exhibited the highest effective lithium ion diffusion rate, after cycling (i.e. $2.06\times10^{-11}$ cm2/s).

$$D_{Li+}=(R^2T^2)/(2A^2n^4F^4C^2\sigma^2) \qquad \text{(Equation 1)}$$

$$Z_{re} \alpha \sigma \omega^{-1/2} \qquad \text{(Equation 2)}$$

Additional embodiments of the compositions and method described herein are provided in the enclosed appendices.

While the invention has been described in connection with a manufacture of $Fe_3O_4$ based electrodes for cells and batteries, it is intended that these materials may also be used for other electrodes, i.e., cathodes and anodes. As shown and described with reference to certain embodiments, it will be understood by those skilled in the art that various changes in from and details may be made to these embodiments without departing from the spirit and scope of the present invention and equivalents thereof.

What is claimed is:

1. A method of synthesizing an electrode material for lithium-ion batteries from $Fe_3O_4$ nanoparticles and acid-functionalized multiwalled carbon nanotubes (MWNTs) to yield composite heterostructures ($Fe_3O_4$-MWNTs), the method comprising:
   linking the $Fe_3O_4$ nanoparticles and the acid-functionalized multiwalled carbon nanotubes using a π-π interaction synthesis process to yield the composite heterostructure electrode material.

2. The method of claim 1, wherein the step of linking includes acid-functionalizing the multiwalled carbon nanotubes (MWNTs) includes oxidizing and coating surfaces of the MWNTs with oxygenated moieties comprising carboxylic acid.

3. The method of claim 2, wherein the linking anchors the $Fe_3O_4$ nanoparticles onto the surfaces of the acid-functionalized multiwalled carbon nanotubes.

4. The method of claim 1, wherein prior to linking, the $Fe_3O_4$ nanoparticles are first functionalized with 4-mercaptobenzoic acid (4-MBA) linker molecules.

5. The method of claim 4, wherein the functionalizing includes dispersing $Fe_3O_4$ nanoparticles in an ethanolic solution of 4-mercaptobenzoic acid (4-MBA) and stirring to facilitate either a mondentate or bidentate coordination mode between terminal carboxylic acid groups of 4-MBA linker molecules and corresponding Fe sites localized on the $Fe_3O_4$ surfaces.

6. The method of claim 5, further comprising isolating the functionalized $Fe_3O_4$ including removing any unbound 4-mercaptobenzoic acid (4-MBA) linker molecules.

7. The method of claim 4, wherein the anchoring includes sonicating a solution comprising the 4-mercaptobenzoic acid (4-MBA)functionalized $Fe_3O_4$, the oxidized multiwalled carbon nanotubes, ethanol and dimethyl sulfoxide (DMSO) to form stable π-π interactions between phenyl rings within the 4-MBA linker molecules and an underlying multiwalled carbon nanotube network of the multiwalled carbon nanotubes.

8. The method of claim 1, wherein the $Fe_3O_4$ nanoparticles (NPs) have an average size in a range of 8-10 nm.

9. The method of claim 8, wherein the $Fe_3O_4$ nanoparticles are provided in solution at a loading ratio of 50 wt %.

10. An anode fabricated with an electrode material synthesized by the method of claim 1.

11. A cathode fabricated with an electrode material synthesized by the method of claim 1.

12. An electrode for a lithium-ion cell or battery fabricated with an electrode material synthesized by the method of claim 1, wherein upon pairing the electrode with a pairing electrode fabricated with a higher voltage material during intended use in a lithium-ion cell or battery, the electrode functions as an anode and the pairing electrode of the higher voltage material functions as a cathode and wherein upon pairing the electrode with a pairing electrode fabricated with a lower voltage material, the electrode functions as an anode and the pairing electrode of higher voltage material functions as a cathode.

13. An electrode for a lithium-ion cell or battery, fabricated with an electrode material synthesized according to the method of claim 1.

14. A lithium-ion cell or battery comprising an electrode fabricated with the electrode material synthesized by the method of claim 1.

15. An electrode material for lithium-ion batteries, comprising $Fe_3O_4$ nanoparticles with attached 4-mercaptobenzoic acid (4-MBA) linker molecules and acid-functionalized multiwalled carbon nanotubes (MWNTs) linked by π-π interactions with the 4-MBA linker molecules, forming ($Fe_3O_4$-MWNTs) composite heterostructure electrode materials.

16. The electrode material of claim 15, wherein the 4-mercaptbenzoic acid (4-MBA) linker molecules include phenyl rings and the π-π interactions occur between the phenyl rings and the acid-functionalized multiwalled carbon nanotubes (MWNTs).

17. The electrode material of claim 15, wherein the surfaces of the acid-functionalized multiwalled carbon nanotubes (MWNTs) include an oxidized carboxylic acid coating.

18. The electrode material of claim 15, wherein the $Fe_3O_4$ nanoparticles have an average size in a range of 8-10 nm.

19. An electrode fabricated with the electrode material of claim 15.

20. An anode fabricated with an electrode material of claim 15.

21. A cathode fabricated with an electrode material of claim 15.

22. An electrode for a lithium-ion cell or battery fabricated with an electrode of claim 15, wherein upon pairing the electrode with a pairing electrode fabricated with a higher voltage material during intended use in a lithium-ion cell or battery, the electrode functions as an anode and the pairing electrode of the higher voltage material functions as a cathode and wherein upon pairing the electrode with a pairing electrode fabricated with a lower voltage material, the electrode functions as an anode and the pairing electrode of higher voltage material functions as a cathode.

23. A lithium ion battery including an electrode fabricated from with the electrode material synthesized according to the method of claim 1.

* * * * *